US012784425B2

(12) United States Patent
Na et al.

(10) Patent No.: US 12,784,425 B2
(45) Date of Patent: Nov. 3, 2026

(54) COMPUTATION SYSTEM

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Hyoungjun Na, Nisshin (JP); Hideho Arakida, Nisshin (JP); Tetsuro Takizawa, Nisshin (JP); Tatsuya Tokue, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 218 days.

(21) Appl. No.: 18/663,579

(22) Filed: May 14, 2024

(65) Prior Publication Data

US 2024/0428571 A1 Dec. 26, 2024

(30) Foreign Application Priority Data

Jun. 22, 2023 (JP) ................................ 2023-102515

(51) Int. Cl.
*G06V 10/94* (2022.01)
*G06V 10/764* (2022.01)
(Continued)

(52) U.S. Cl.
CPC .......... *G06V 10/776* (2022.01); *G06V 10/764* (2022.01); *G06V 10/82* (2022.01); *G06V 10/94* (2022.01)

(58) Field of Classification Search
CPC .... G06V 10/776; G06V 10/764; G06V 10/82; G06V 10/94; G06F 11/079; G06N 3/08
(Continued)

(56) References Cited

U.S. PATENT DOCUMENTS

| | | |
|---|---|---|
| 5,953,742 A | 9/1999 | Williams |
| 6,065,135 A | 5/2000 | Marshall et al. |

(Continued)

OTHER PUBLICATIONS

Yiwen Guo et al., "Dynamic Network Surgery for Efficient DNNs", 30th Conference on Neural Information Processing Systems (NIPS2016), proceedings.neurips.cc/paper/2016/file/2823f4797102ce1a1aec05359cc16dd9-Paper.pdf.

(Continued)

*Primary Examiner* — Stephen P Coleman
(74) *Attorney, Agent, or Firm* — Posz Law Group, PLC

(57) ABSTRACT

A computation system using a neural network model includes: processor cores; a computation allocation unit that determines a computation processor core; and an anomaly detection unit that detects an anomaly in the computation processor core. The computation allocation unit causes an anomaly detection processor core to execute an anomaly detection computation. When a difference between a first computation result of a basic computation and a second computation result of the anomaly detection computation satisfies an allowance condition, the anomaly detection unit determines that the computation processor core and the anomaly detection processor core are normal. When the difference does not satisfy the allowance condition, the anomaly detection unit determines that at least a part of the computation processor core and the anomaly detection processor core has anomaly.

11 Claims, 10 Drawing Sheets

(51) Int. Cl.
*G06V 10/776* (2022.01)
*G06V 10/82* (2022.01)

(58) Field of Classification Search
USPC .......................................................... 382/156
See application file for complete search history.

(56) References Cited

U.S. PATENT DOCUMENTS

| | | | | |
|---|---|---|---|---|
| 2006/0062046 | A1 | 3/2006 | Babudri et al. | |
| 2013/0262917 | A1 | 10/2013 | Takemori | |
| 2019/0138903 | A1* | 5/2019 | Bose | G06N 3/08 |
| 2019/0266015 | A1* | 8/2019 | Chandra | G06F 9/4881 |

OTHER PUBLICATIONS

Asit Mishra et al., “Accelerating Sparse Deep Neural Networks”, Conference on Machine Learning 2021, arxiv.org/abs/2104.08378.

* cited by examiner

COMPUTATION SYSTEM

CROSS REFERENCE TO RELATED APPLICATION

The present application claims the benefit of priority from Japanese Patent Application No. 2023-102515 filed on Jun. 22, 2023. The entire disclosure of the above application is incorporated herein by reference.

TECHNICAL FIELD

The present disclosure relates to a computation system.

BACKGROUND

Conventionally, in order to ensure the functional safety of a computation system including a processor, there has been a need for a method of detecting an anomaly when the anomaly occurs in the computation system. A conceivable technique teaches a system that includes a processor core for anomaly detection in addition to a processor core used in normal times to detect anomaly in the system, and compares the computation results of the two processor cores with each other. Further, another conceivable technique teaches a system that compares the computation result of a processor core at the time of system activation with the computation result stored in a memory in advance in order to detect an anomaly in the system.

SUMMARY

According to an example, a computation system using a neural network model may include: processor cores; a computation allocation unit that determines a computation processor core; and an anomaly detection unit that detects an anomaly in the computation processor core. The computation allocation unit causes an anomaly detection processor core to execute an anomaly detection computation. When a difference between a first computation result of a basic computation and a second computation result of the anomaly detection computation satisfies an allowance condition, the anomaly detection unit determines that the computation processor core and the anomaly detection processor core are normal. When the difference does not satisfy the allowance condition, the anomaly detection unit determines that at least a part of the computation processor core and the anomaly detection processor core has anomaly.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
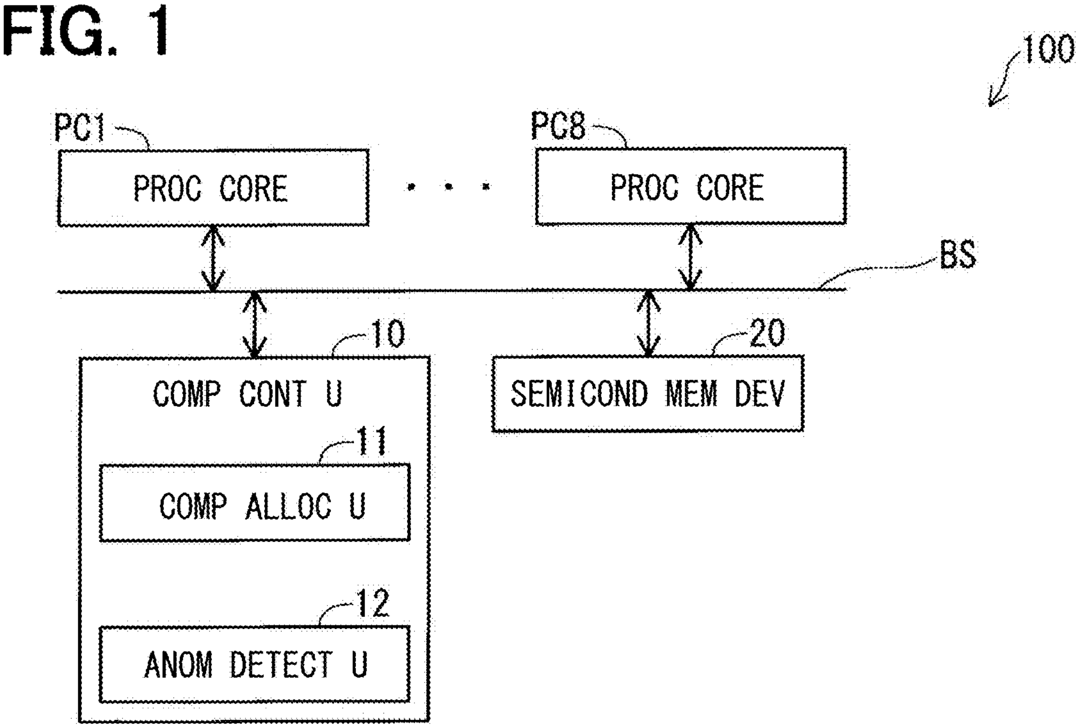
FIG. 1 is a block diagram showing a schematic configuration of a computation system according to embodiments.

A similar configuration as the conceivable techniques can also be applied to a computation system including an NPU (i.e., Neural network Processing Unit) that performs a computation process using a neural network. However, in the conceivable technique, since a processor core for anomaly detection is provided in addition to a processor core used in normal times, there may be a difficulty that the system configuration has overperformance. Further, in the other conceivable technique, there may be a difficulty that the computation result stored in the memory in advance can only be compared at the time of system activation, and the anomaly cannot be detected for newly output computation result.

The present embodiments can be realized as the following features.

According to one aspect of the present embodiments, a computation system performs a computation process using a neural network model. The computation system includes: a plurality of processor cores that execute the computation process; a computation allocation unit that determines a computation processor core, which is one of the plurality of processor cores and is to execute the computation process, according to a computation load of the computation process, and causes the computation processor core to execute the computation process; and an anomaly detection unit that detects presence or absence of an anomaly in the computation processor core. The computation allocation unit causes at least a part of the plurality of processor cores different from the computation processor core to execute an anomaly detection computation process prepared based on a basic computation process, which is the computation process to be executed by the computation processor core, in parallel to the basic computation process. When a difference between a first computation result, which is a computation result of the basic computation process, and a second computation result, which is a computation result of the anomaly detection computation, satisfies a predetermined allowance condition, the anomaly detection unit determines that the computation processor core and an anomaly detection processor core that executes the anomaly detection computation process are normal. When the difference does not satisfy the allowable condition, the anomaly detection unit determines that at least a part of the computation processor core and the anomaly detection processor core has anomaly.

According to the feature of the control device, the computation processor core is determined among the plurality of processor cores according to the computation load of the computation process. The presence or absence of the anomaly can be detected by determining whether the computation result of the basic computation process executed by the computation processor core matches the computation result of the anomaly detection computation process executed by the anomaly detection processor core. Therefore, compared to a configuration that includes an anomaly detection processor core in addition to a processor core used during normal times, it is possible to detect the presence or absence of an anomaly while suppressing overperformance in the system configuration. Furthermore, the presence or absence of an anomaly can be detected using the newly output computation results.

A. First Embodiment

A-1. System Configuration:

The computation system 100 of this embodiment executes a computation process using a neural network model. In this embodiment, the computation system 100 performs the computation process on image data as a target captured by a camera mounted on a vehicle to determine pedestrians, structures, and the like included in the image data. In this embodiment, the neural network model is configured as a multi-class classifier that outputs the probability that each object included in the image data belongs to one class among a plurality of predetermined classes based on the image data. Here, the computation system 100 may perform the computation process not only on the image data but also on sound data and text data.

Figure 2:
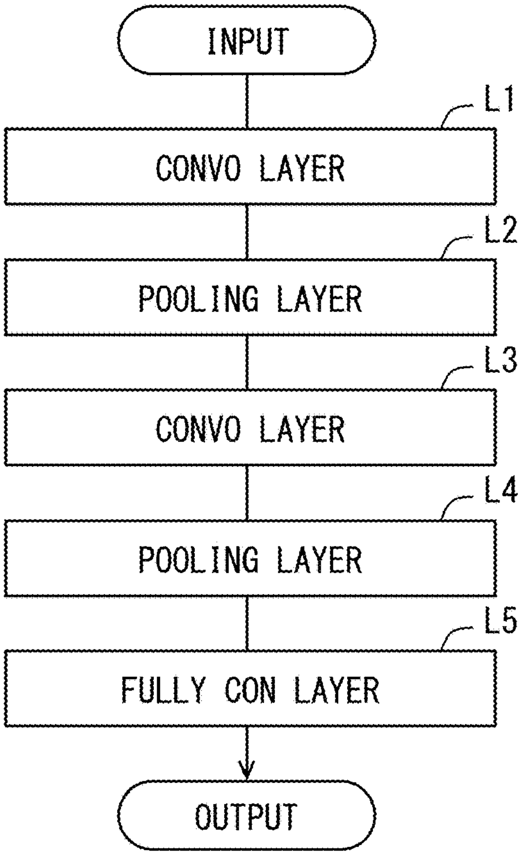
FIG. 2 is an explanatory diagram showing an example of the configuration of a neural network model.

FIG. 2 shows an example of a neural network model. The neural network model shown in FIG. 2 includes a convolution layer L1, a pooling layer L2, a convolution layer L3, a pooling layer L4, and a fully connected layer L5. The computation system 100 executes the computation in each layer in this order. Here, the computation system 100 may perform the computation process using not only the neural network model having the configuration shown in FIG. 2 but also any neural network model having any configuration. Furthermore, the computation system 100 may perform the computation process that sequentially uses multiple types of neural network models, in addition to the computation process that uses a single type of neural network model.

As shown in FIG. 1, the computation system 100 includes processor cores PC1 to PC8, a computation control unit 10, and a semiconductor memory device 20. The processor cores PC1 to PC8, the computation control unit 10, and the semiconductor memory device 20 are communicably connected to each other via a bus BS. Here, the computation system 100 may include a cache memory, a register and the like in addition to the above configuration.

In this embodiment, the processor cores PC1 to PC8 are configured as an NPU (i.e., Neural network Processing Unit) that executes the computation process using a neural network model. The specific configurations of the processor cores PC1 to PC8 are similar to the configuration of a conventional NPUs, so detailed description will be omitted. In this embodiment, the processor cores PC1 to PC8 receive a single image data input, and the plurality of processor cores share mutually different regions of the image data, and execute the computation process in parallel with each other. Here, any one of the processor cores PC1 to PC8 may perform the computation process on a single image data.

The number of processor cores included in the computation system 100 may not be limited to eight, but may be two or more as long as the computation system can complete the computation process having the maximum computation load expected in the computation system 100 within a predetermined allowance time. The "allowance time" is set, for example, as an upper limit time allowed for identifying pedestrians, structures, and the like that are disposed around the vehicle. In the following description, the computation load of the computation process that requires all processor cores to operate in parallel in order to complete the computation process within the allowance time will be referred to as the "maximum computation load." The "computation load of the computation process" is determined based on the type of the neural network model used in the computation process, more specifically, the number of layers that constitute the neural network model, the type of computations executed in each layer, and the like.

The computation control unit 10 includes a computation allocation unit 11 and an anomaly detection unit 12. The computation allocation unit 11 determines one of the processor cores PC1 to PC8 (hereinafter also referred to as "computation processor core") to execute the computation process according to the computation load of the computation process, and causes the computation processor core to execute the computation process. In the following description, the computation process to be executed in the computation processor core is also referred to as "a basic computation". In the present embodiment, the computation allocation unit 11 determines the minimum number of processor cores (hereinafter also referred to as "minimum number of cores") required to complete the basic computation within the allowance time as the computation processor cores. The minimum number of cores is set in advance for each type of the basic computation to be executed.

Further, the computation allocation unit 11 causes a processor core other than the computation processor core among the processor cores PC1 to PC8 to execute the anomaly detection computation. The "anomaly detection computation" is a computation process to be executed to detect the presence or absence of an anomaly in a processor core, and a computation process prepared based on the basic computation. The computation allocation unit 11 determines the number of processor cores (hereinafter also referred to as "anomaly detection processor cores") to execute the anomaly detection computation according to the computation load of the basic computation. In this embodiment, the computation allocation unit 11 causes the anomaly detection processor core to execute the same computation process as the basic computation as the anomaly detection computation. A specific method of allocating the anomaly detection computation to the anomaly detection processor cores by the computation allocation unit 11 will be described later.

The anomaly detection unit 12 detects the presence or absence of an anomaly in the processor core by determining whether the difference between the computation result of the basic computation and the computation result of the anomaly detection computation satisfies a predetermined allowance condition. Here, the anomaly detection unit 12 may be a functional unit implemented on software by executing a program, or may be a functional unit implemented on hardware using a logic circuit. Specific processing by the anomaly detection unit 12 will be described later.

The semiconductor memory device 20 stores various data input/output via the bus BS during the computation process executed in the processor cores PC1 to PC8, such as image data, coefficients used in the computation process, and computation results. In this embodiment, the semiconductor memory device 20 is configured as a DRAM (i.e., Dynamic Random Access Memory).

Figure 3:
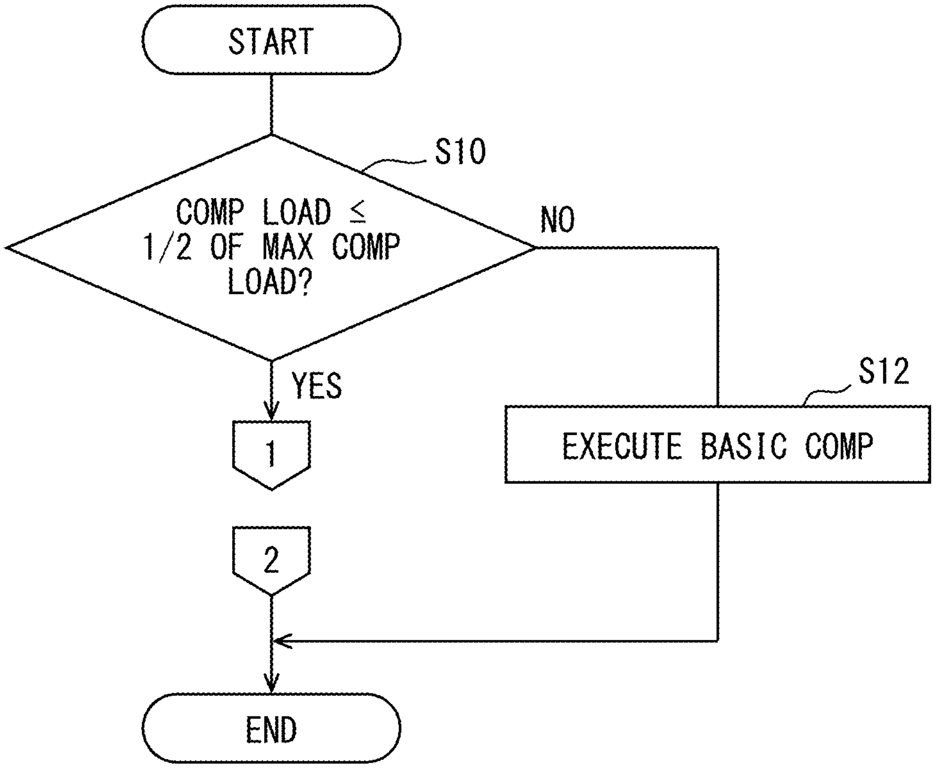
FIG. 3 is a flowchart showing the procedure of an anomaly detection process according to the first embodiment.
Figure 4:
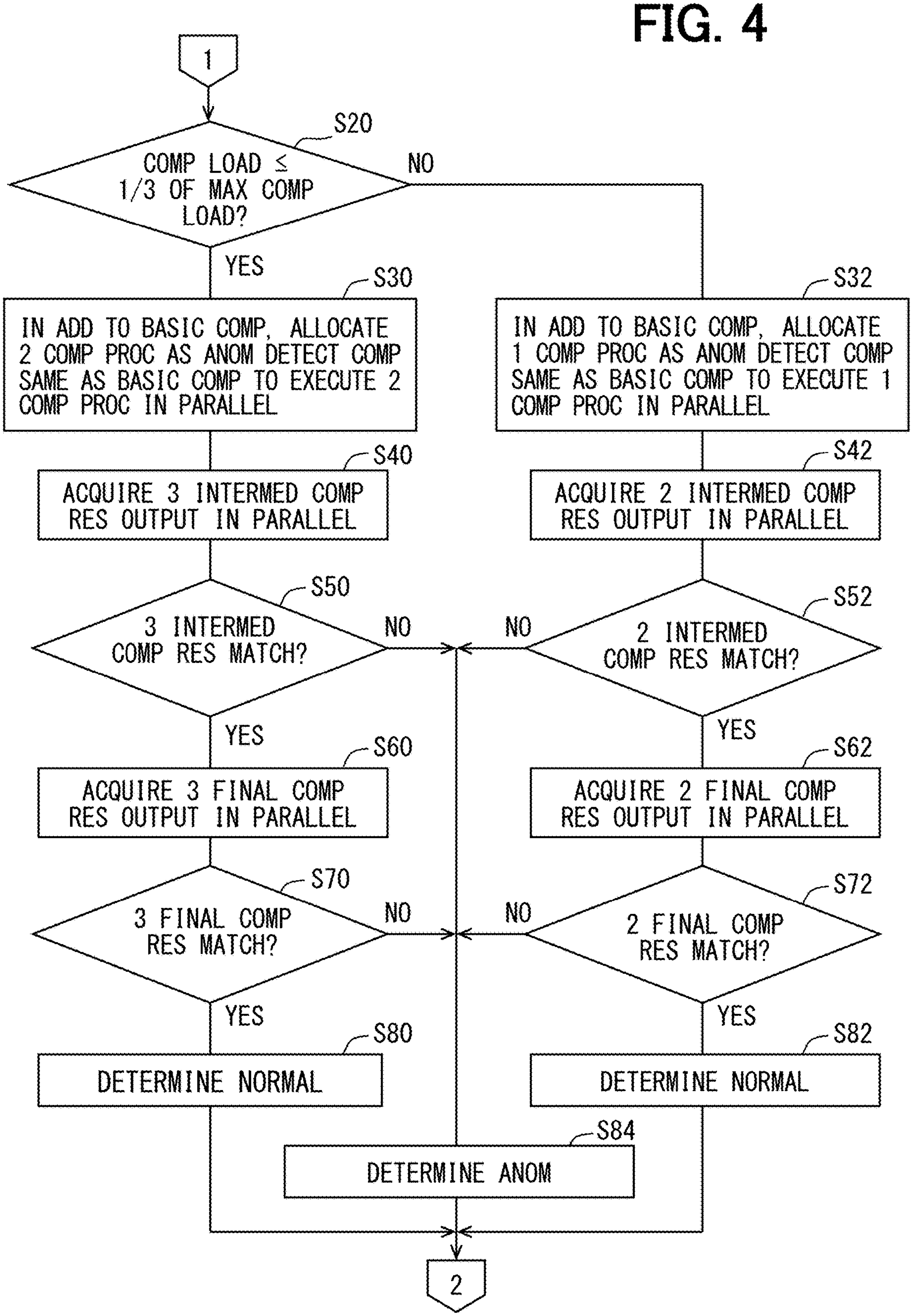
FIG. 4 is a flowchart showing the procedure of an anomaly detection process according to the first embodiment.

A-2. Anomaly Detection Processing:

The computation control unit 10 executes the anomaly detection process shown in FIGS. 3 and 4, and executes the anomaly detection computation on the anomaly detection processor core in parallel with the basic computation by the computation processor core according to the computation load of the basic computation to detect whether there is an anomaly in the processor core. The anomaly detection process is executed each time a basic computation is started in the computation system 100. In the following description, the computation process to be executed is performed for the image data as the process target.

In step S10 shown in FIG. 3, the computation allocation unit 11 determines whether the computation load of the basic computation is less than or equal to ½ of the maximum computation load. If it is determined that the computation load is larger than ½ of the maximum computation load ("NO" at step S10), the computation allocation unit 11 causes the computation processor core to execute the basic computation, and ends the anomaly detection process. That is, in such a case, the anomaly detection unit 12 does not perform anomaly detection.

On the other hand, if it is determined that the computation load is less than or equal to a half of the maximum computation load ("YES" at step S10), the computation allocation unit 11 determines in step S20 shown in FIG. 4 whether the computation load of the basic computation is equal to or less than ⅓ of the maximum computation load.

If it is determined that the computation load is equal to or less than ⅓ of the maximum computation load ("YES" at step S20), the computation allocation unit 11 allocates the computation processes to the processor cores in step S30 so that two computation processes same as the basic computation are executed in parallel to each other as an anomaly detection computation in addition to the basic computation.

The allocation of the computation processes in step S30 will be explained in more detail with reference to the example shown in FIG. 5. In the example shown in FIG. 5, the minimum number of cores for the basic computation is set as two. In such a case, the computation allocation unit 11 allocates the basic computation to the processor cores PC1 and PC2, the first anomaly detection computation to the processor cores PC3 and PC4, and the second anomaly detection computation to the processor cores PC5 and PC6. In the example shown in FIG. 5, the processor cores PC1 and PC2 correspond to the computation processor cores, the processor cores PC3 and PC4 and the processor cores PC5 and PC6 correspond to the anomaly detection processor cores.

Figure 5:
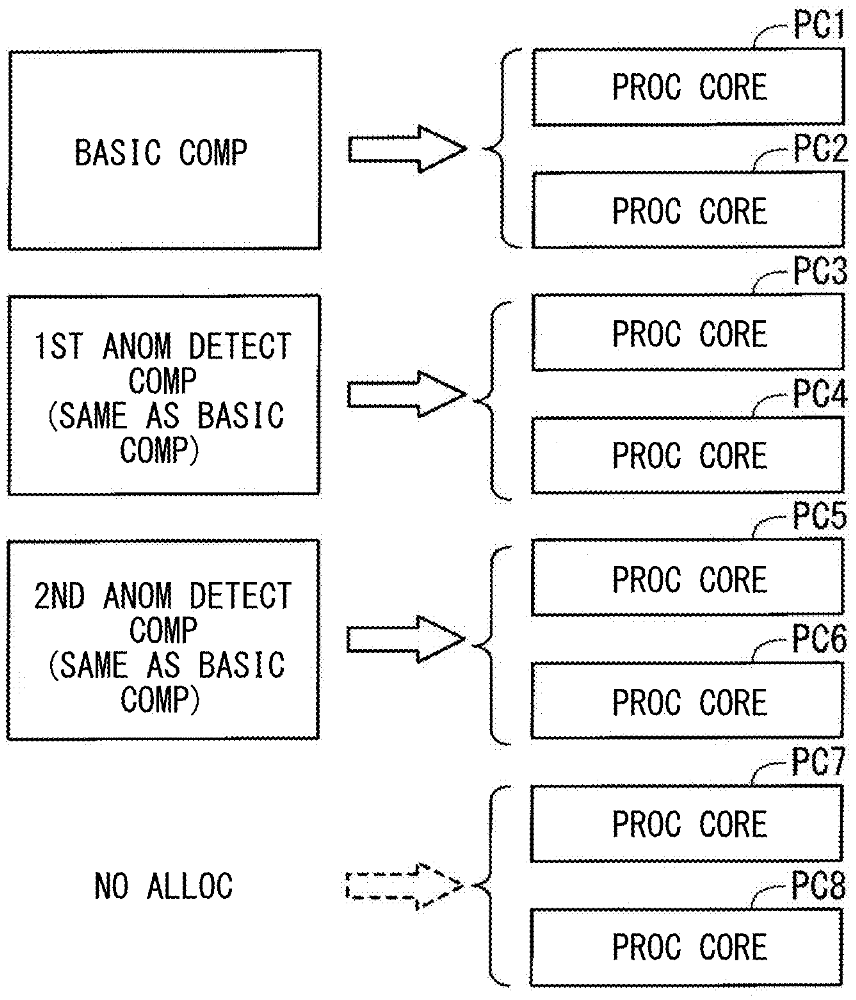
FIG. 5 is an explanatory diagram showing an example of allocation of the computation process in the first embodiment.

In the example shown in FIG. 5, the computation allocation unit 11 does not allocate the computation process to the processor cores PC7 and PC8. In a configuration in which the computation process is not allocated to the processor cores PC7 and PC8, it is possible to restrict the increase in electric power consumption and processing load in the computation system 100, compared to a configuration in which the computation process is allocated to the processor cores PC7 and PC8. Here, the computation allocation unit 11 may allocate the computation process to the processor cores PC7 and PC8.

In step S40 shown in FIG. 4, the anomaly detection unit 12 acquires three intermediate computation results of the basic computation and two anomaly detection computations that are output in parallel. The "intermediate computation result" means a computation result in an intermediate layer among a plurality of layers that constitute a neural network model. In the example shown in FIG. 2, the convolution layer L1, the pooling layer L2, the convolution layer L3, and the pooling layer L4 correspond to intermediate layers, and in this embodiment, the computation result in the pooling layer L2 is acquired as the intermediate computation result. Here, the anomaly detection unit 12 may acquire each computation result in two or more intermediate layers as the intermediate computation result, instead of acquiring one of the plurality of intermediate layers. In the example shown in FIG. 5, the basic computation and the two anomaly detection computations are executed in the same number of processor cores, so the intermediate computation results for corresponding pixels are output in parallel with each other.

The anomaly detection unit 12 acquires intermediate computation results of the basic computation and two anomaly detection computations for mutually corresponding pixels each time the intermediate computation results are output in parallel. More specifically, the anomaly detection unit 12 directly acquires each intermediate computation result output from the computation processor core and the anomaly detection processor core. Here, the anomaly detection unit 12 may acquire each intermediate computation result from the semiconductor memory device 20 after the semiconductor memory device 20 temporarily stores the intermediate computation result outputted from the computation processor core and the anomaly detection processor core.

In step S50 shown in FIG. 4, the anomaly detection unit 12 determines whether the three intermediate computation results of the basic computation and the two anomaly detection computations match each other as an allowance condition. Since the anomaly detection unit 12 executes the determination using intermediate computation results, it is possible to detect an anomaly in the processor core at an early stage without waiting for the output of the final computation result, which will be described later, and restrict the increase in time required for the anomaly detection process.

The anomaly detection unit 12 may perform the determination in step S50 on all pixels in the image data as the process target, or may perform the determination on a predetermined part of pixels in the image data. In a configuration in which the determination is performed for all pixels, the presence or absence of an anomaly can be detected with higher accuracy. On the other hand, in a feature in which the determination is performed for a part of the pixels, the number of times the determination is performed can be reduced, and therefore it is possible to restrict the increase in the processing load and the processing time on the anomaly detection unit 12. Which determination method to adopt may be arbitrarily selected in consideration of the above-described length of the allowance time, required accuracy of anomaly detection, and the like.

If it is determined that the three intermediate computation results do not match each other ("NO" at step S50), in step S84, the anomaly detection unit 12 determines that there is an anomaly in at least a part of the computation processor core and the anomaly detection processor core. The feature that "the three intermediate computation results of the basic computation and the two anomaly detection computations do not match each other" indicates that at least one of the three intermediate computation results does not match the other intermediate computation results. The anomaly detection unit 12 determines whether or not the three intermediate computation results match each other, so if the three intermediate computation results do not match each other, it is possible to identify the processor core having the high probability that the anomaly has occurred. For example, in the example shown in FIG. 5, if the intermediate computations of the first anomaly detection computation and the second anomaly detection computation match each other, and only the intermediate computation result of the basic computation differs, it is possible to identify that the probability that the anomaly has occurred in the processor core PC1 or the processor core PC2 is high. After step S84 ends, the anomaly detection process ends.

On the other hand, in FIG. 4, if it is determined that the three intermediate computation results match each other ("YES" at step S50), in step S60, the anomaly detection unit 12 acquires three final computation results of the basic computation and two anomaly detection computations which are output in parallel to each other. The "final computation result" means a computation result in a final layer among a plurality of layers that constitute a neural network model. In the example shown in FIG. 2, the layer L5 corresponds to the final layer. For the same reason as in the case of the intermediate computation results described above, the final computation results for mutually corresponding pixels are output in parallel with each other.

As in the case of the intermediate computation results described above, the anomaly detection unit 12 acquires each final computation results for each corresponding pixel each time the final computation results of the basic computation and two anomaly detection computations are output in parallel. More specifically, the anomaly detection unit 12 directly acquires each final computation result output from the computation processor core and the anomaly detection processor core. Here, the anomaly detection unit 12 may acquire each final computation result from the semiconductor memory device 20 after the semiconductor memory device 20 temporarily stores the final computation result outputted from the computation processor core and the anomaly detection processor core.

In step S70 shown in FIG. 4, the anomaly detection unit 12 determines whether the three final computation results of the basic computation and the two anomaly detection computations match each other as an allowance condition. Since the anomaly detection unit 12 executes the determination using the final computation result, the reliability of the final computation result can be ensured.

If it is determined that the three final computation results match each other ("YES" at step S70), in step S80, the anomaly detection unit 12 determines that there is no anomaly in the computation processor core and the anomaly detection processor core. After step S80 ends, the anomaly detection process ends.

If it is determined that the three final computation results do not match each other ("NO" at step S70), in step S84, the anomaly detection unit 12 determines that there is an anomaly in at least a part of the computation processor core and the anomaly detection processor core. The feature that "the three final computation results of the basic computation and the two anomaly detection computations do not match each other" indicates that at least one of the three final computation results does not match the other final computation results. The anomaly detection unit 12 determines whether or not the three final computation results match each other, so if the three final computation results do not match each other, it is possible to identify the processor core having the high probability that the anomaly has occurred. The method for identifying a processor core having the high probability that an anomaly has occurred is the same as in the case where the determination result in step S50 described above is "NO". After step S84 ends, the anomaly detection process ends.

Returning to the determination in step S20 described above, if it is determined that the computation load of the basic computation is larger than ⅓ of the maximum computation load ("NO" at step S20), in step S32, the computation allocation unit 11 allocates the computation process to the processor core so that one computation process same as the basic computation as an anomaly detection computation is executed in parallel to the basic computation in addition to the basic computation.

In step S42, the anomaly detection unit 12 acquires two intermediate computation results of the basic computation and the anomaly detection computation that are output in parallel. The intermediate layer that acquires the intermediate computation results and the timing of acquiring the intermediate computation results are the same as in step S40 described above.

In step S52, the anomaly detection unit 12 determines whether the two intermediate computation results of the basic computation and the anomaly detection computation match each other as an allowance condition. If it is determined that the two intermediate computation results do not match each other ("NO" at step S52), in step S84, the anomaly detection unit 12 determines that there is an anomaly in at least a part of the computation processor core and the anomaly detection processor core. After step S84 ends, the anomaly detection process ends.

On the other hand, if it is determined that the two intermediate computation results match each other ("YES" at step S52), in step S62, the anomaly detection unit 12 acquires two final computation results of the basic computation and the anomaly detection computation which are output in parallel to each other. The timing of acquiring the final computation results is the same as in step S60 described above.

In step S72, the anomaly detection unit 12 determines whether the two final computation results of the basic computation and the anomaly detection computation match each other as an allowance condition. If it is determined that the two final computation results match each other ("YES" at step S72), in step S82, the anomaly detection unit 12 determines that there is no anomaly in the computation processor core and the anomaly detection processor core. After step S82 ends, the anomaly detection process ends.

If it is determined that the two final computation results do not match each other ("NO" at step S72), in step S84, the anomaly detection unit 12 determines that there is an anomaly in at least a part of the computation processor core and the anomaly detection processor core. After step S84 ends, the anomaly detection process ends.

According to the computation system 100 of the first embodiment described above, a computation core is determined among the plurality of processor cores according to the computation load of the computation process, and it is determined whether the computation result of the basic computation executed in the computation core and the computation result of the anomaly detection computation executed in the anomaly detection processor core match each other, so that it is possible to detect the presence or absence of an anomaly. Therefore, compared to a configuration that includes an anomaly detection processor core in addition to a processor core used during normal times, it is possible to detect the presence or absence of an anomaly while suppressing overperformance in the system configuration.

Further, since the anomaly detection unit 12 detects the presence or absence of an anomaly using the computation results output in parallel with each other, it is possible to detect the presence or absence of an anomaly in real time.

Further, the computation allocation unit 11 causes the anomaly detection core to execute the same computation process as the basic computation as the anomaly detection computation, and the anomaly detection unit 12 detects the presence or absence of an anomaly by determining whether the computation result of the basic computation and the computation result of the anomaly detection computation match each other, so that it is possible to detect the anomaly easily.

In addition, since the anomaly detection unit 12 determines the presence or absence of an anomaly using intermediate computation results, it is possible to detect an anomaly at an early stage without waiting for the output of the final computation result, and it is possible to restrict an increase in the time required for anomaly detection. Further, since the anomaly detection unit 12 uses the final computation result to determine the presence or absence of an anomaly, the reliability of the final computation result can be ensured.

B. Second Embodiment

Figure 6:
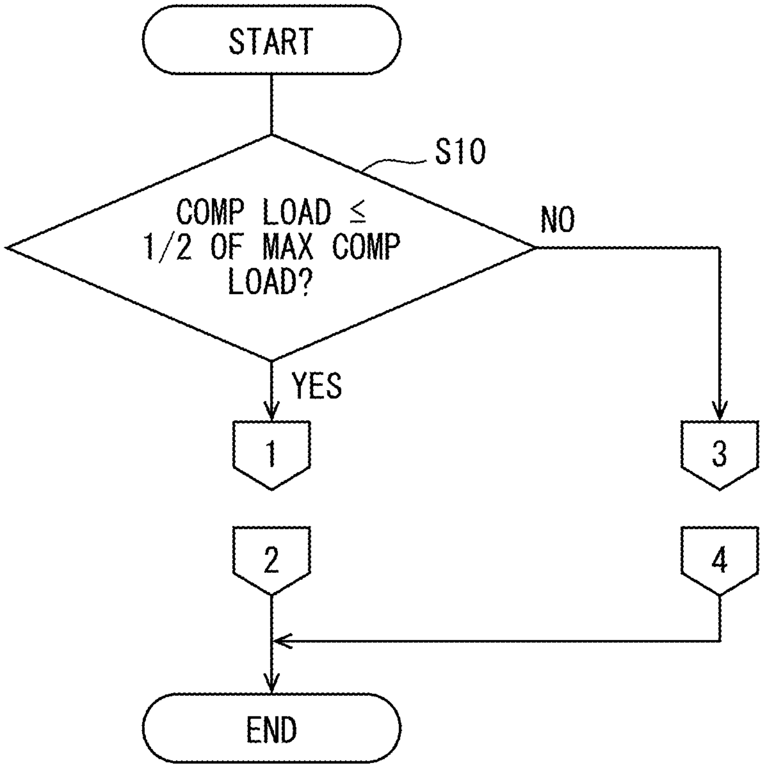
FIG. 6 is a flowchart showing the procedure of an anomaly detection process according to the second embodiment.
Figure 7:
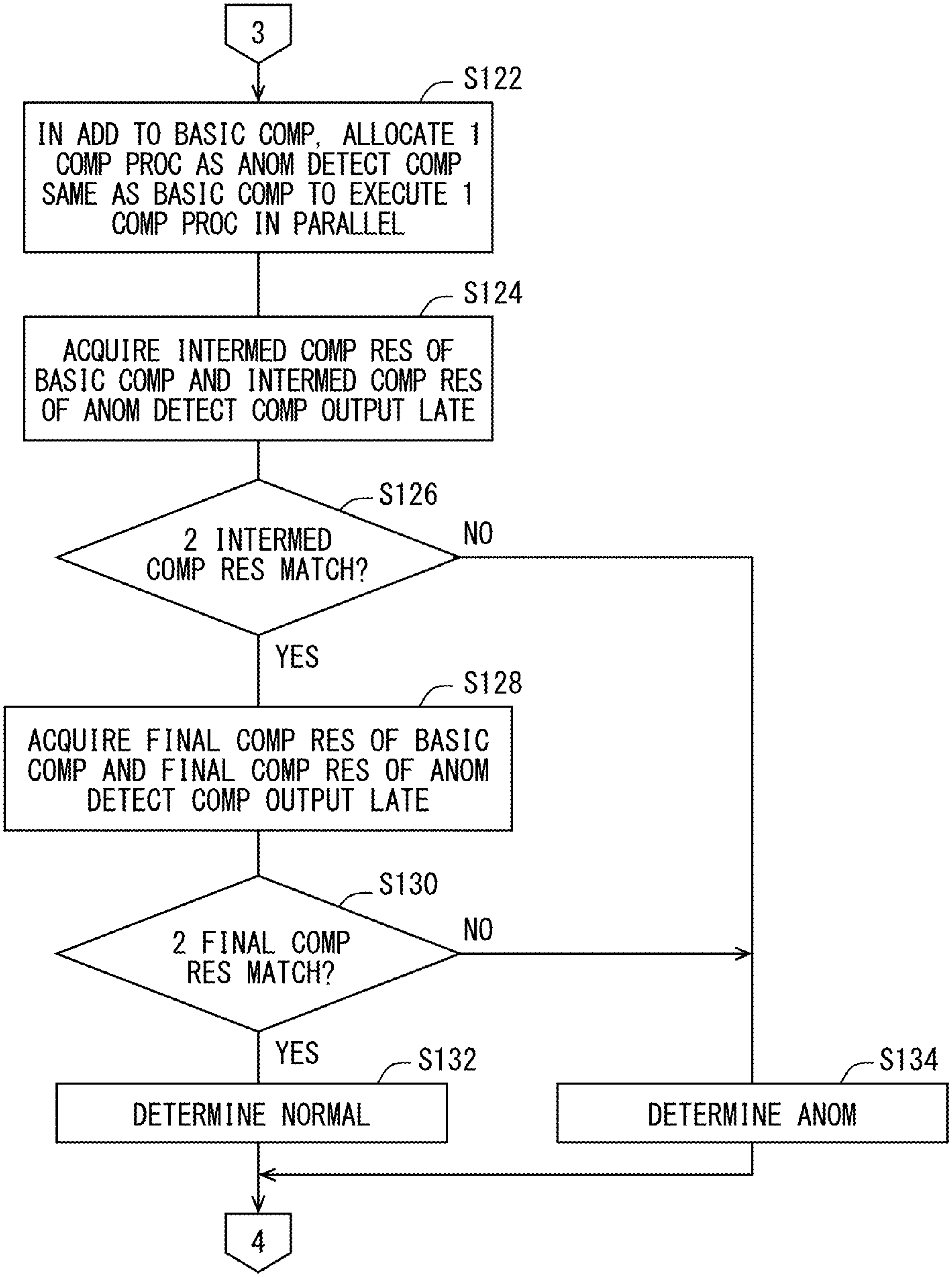
FIG. 7 is a flowchart showing the procedure of an anomaly detection process according to the second embodiment.

As shown in FIG. 6, the computation system 100 of the second embodiment differs from the computation system 100 of the first embodiment in that it executes the process shown in FIG. 7 instead of step S12 shown in FIG. 3. The system configuration and other procedures in the anomaly detection process of the computing system 100 of the second embodiment are the same as those of the computing system 100 of the first embodiment, so the same configurations and the same procedures are denoted by the same reference numerals, and a detailed explanation thereof will be omitted.

If it is determined in step S10 that the computation load of the basic computation is equal to or smaller than ½ of the maximum computation load ("NO" at step S10), in step S122 shown in FIG. 7, the computation processes are allocated to the processor cores so that one computation process same as the basic computation as an anomaly detection computation is executed in parallel to the basic computation in addition to the basic computation.

Figure 8:
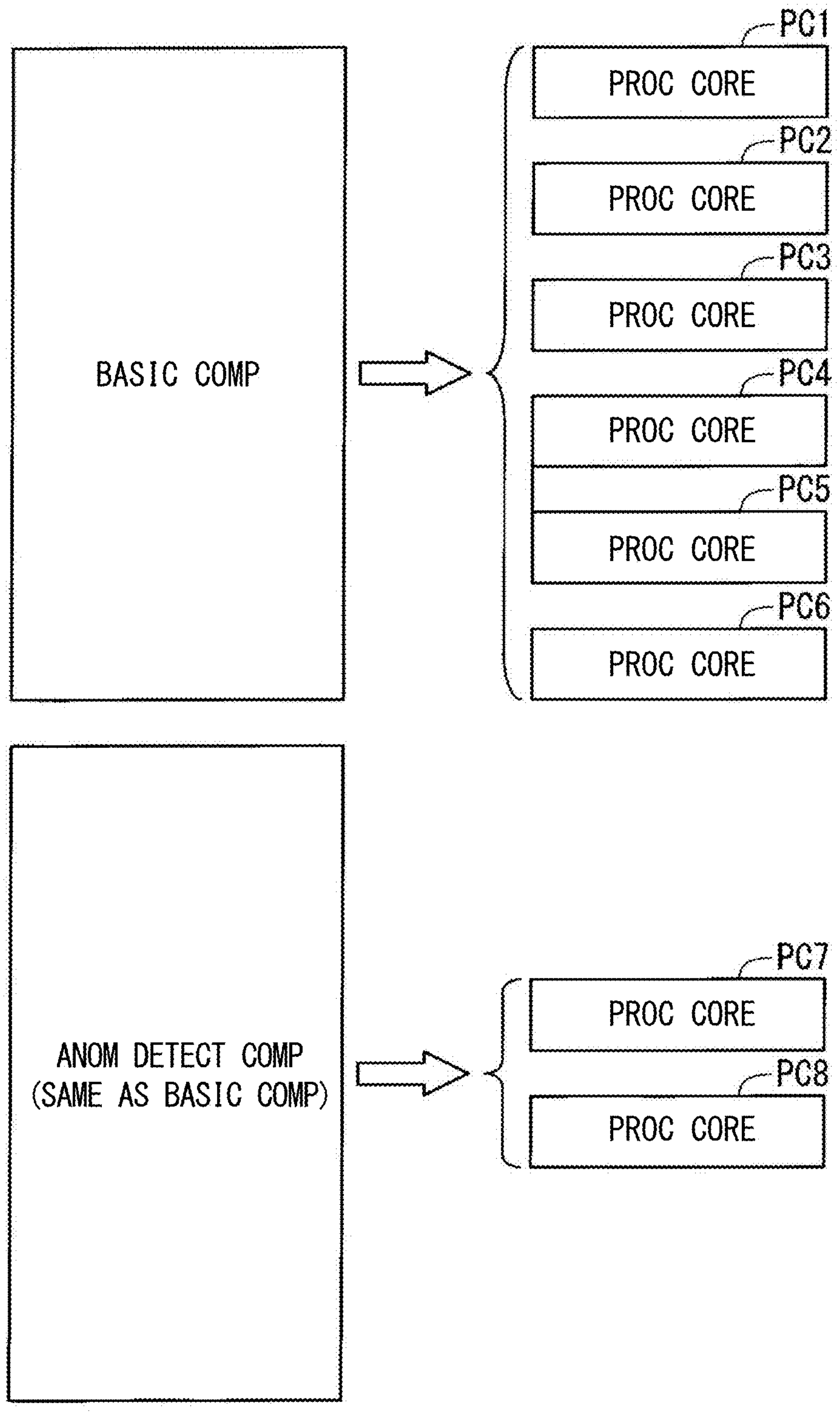
FIG. 8 is an explanatory diagram showing an example of allocation of the computation process in the second embodiment.

The allocation of the computation processes in step S122 will be explained in more detail with reference to the example shown in FIG. 8. In the example shown in FIG. 8, the minimum number of cores for the basic computation is set as six. In such a case, the computation allocation unit 11 allocates the basic computation to the processor cores PC1 to PC6, and allocates the anomaly detection computation to the processor cores PC7 and PC8. In the example shown in FIG. 8, the processor cores PC1 to PC6 correspond to the computation processor cores, and the processor cores PC7 and PC8 correspond to the anomaly detection processor cores.

In step S124 shown in FIG. 7, the anomaly detection unit 12 acquires the intermediate computation result of the basic computation and the intermediate computation result of the anomaly detection computation that is output later than the intermediate computation result of the basic computation. The intermediate layer that acquires the intermediate computation results is the same as in step S40 described above. In the example shown in FIG. 8, the number of processor cores that execute the anomaly detection computation is smaller than the number of processor cores that execute the basic computation. Therefore, the time to complete the computation in the intermediate layer in the anomaly detection computation is longer than the time to complete the computation in the intermediate layer in the basic computation. In this way, the intermediate computation results of the anomaly detection computation are output later than the intermediate computation results of the basic computation for mutually corresponding pixels.

The anomaly detection unit 12 acquires each intermediate computation result every time the intermediate computation result of the anomaly detection computation is output after the intermediate computation result of the basic computation is output for mutually corresponding pixels. More specifically, the anomaly detection unit 12 directly acquires the intermediate computation result of the anomaly detection computation output from the anomaly detection processor core, and acquires the intermediate computation result of the basic computation from the semiconductor memory device 20 after the semiconductor memory device 20 temporarily stores the intermediate computation result of the basic computation outputted from the computation processor core. Further, the anomaly detection unit 12 may acquire the intermediate computation result of the anomaly detection computation from the semiconductor memory device 20 after the semiconductor memory device 20 temporarily stores the intermediate computation result of the anomaly detection computation outputted from the anomaly detection processor core.

In step S126 shown in FIG. 7, the anomaly detection unit 12 determines whether the two intermediate computation results of the basic computation and the anomaly detection computation match each other as an allowance condition. If it is determined that the two intermediate computation results do not match each other ("NO" at step S126), in step S134, the anomaly detection unit 12 determines that there is an anomaly in at least a part of the computation processor core and the anomaly detection processor core. After step S134 ends, the anomaly detection process ends.

On the other hand, if it is determined that the two intermediate computation results match each other ("YES" at step S126), in step S128, the anomaly detection unit 12 acquires the final computation result of the basic computation and the final computation result of the anomaly detection computation that is output later than the final computation result of the basic computation. For the same reason as the above-described intermediate computation results, the final computation result of the anomaly detection computation is output later than the final computation result of the basic computation for mutually corresponding pixels.

As in the case of the above-described intermediate computation results, the anomaly detection unit 12 acquires each final computation result for mutually corresponding pixels each time the final computation result of the anomaly detection computation is output after the final computation result of the basic computation is output. More specifically, the anomaly detection unit 12 directly acquires the final computation result of the anomaly detection computation output from the anomaly detection processor core, and acquires the final computation result of the basic computation from the semiconductor memory device 20 after the semiconductor memory device 20 temporarily stores the final computation result of the basic computation outputted from the computation processor core. Further, the anomaly detection unit 12 may acquire the final computation result of the anomaly detection computation from the semiconductor memory device 20 after the semiconductor memory device 20 temporarily stores the final computation result of the anomaly detection computation outputted from the anomaly detection processor core.

In step S130, the anomaly detection unit 12 determines whether the two final computation results of the basic computation and the anomaly detection computation match each other as an allowance condition. If it is determined that the two final computation results match each other ("YES" at step S130), in step S132, the anomaly detection unit 12 determines that there is no anomaly in the computation processor core and the anomaly detection processor core. After step S132 ends, the anomaly detection process ends.

If it is determined that the two final computation results do not match each other ("NO" at step S130), in step S134, the anomaly detection unit 12 determines that there is an anomaly in at least a part of the computation processor core and the anomaly detection processor core. After step S134 ends, the anomaly detection process ends.

According to the computation system 100 of the second embodiment described above, the presence or absence of an anomaly is detected using the computation result of the basic computation and the computation result of the anomaly detection computation output after the computation result of the basic computation, so that it is possible to detect the presence or absence of the anomaly even if the computation result of the basic computation and the computation result of the anomaly detection computation are not output by the processor cores in parallel to each other since the computation load of the basic computation is large.

C. Third Embodiment

Figure 9:
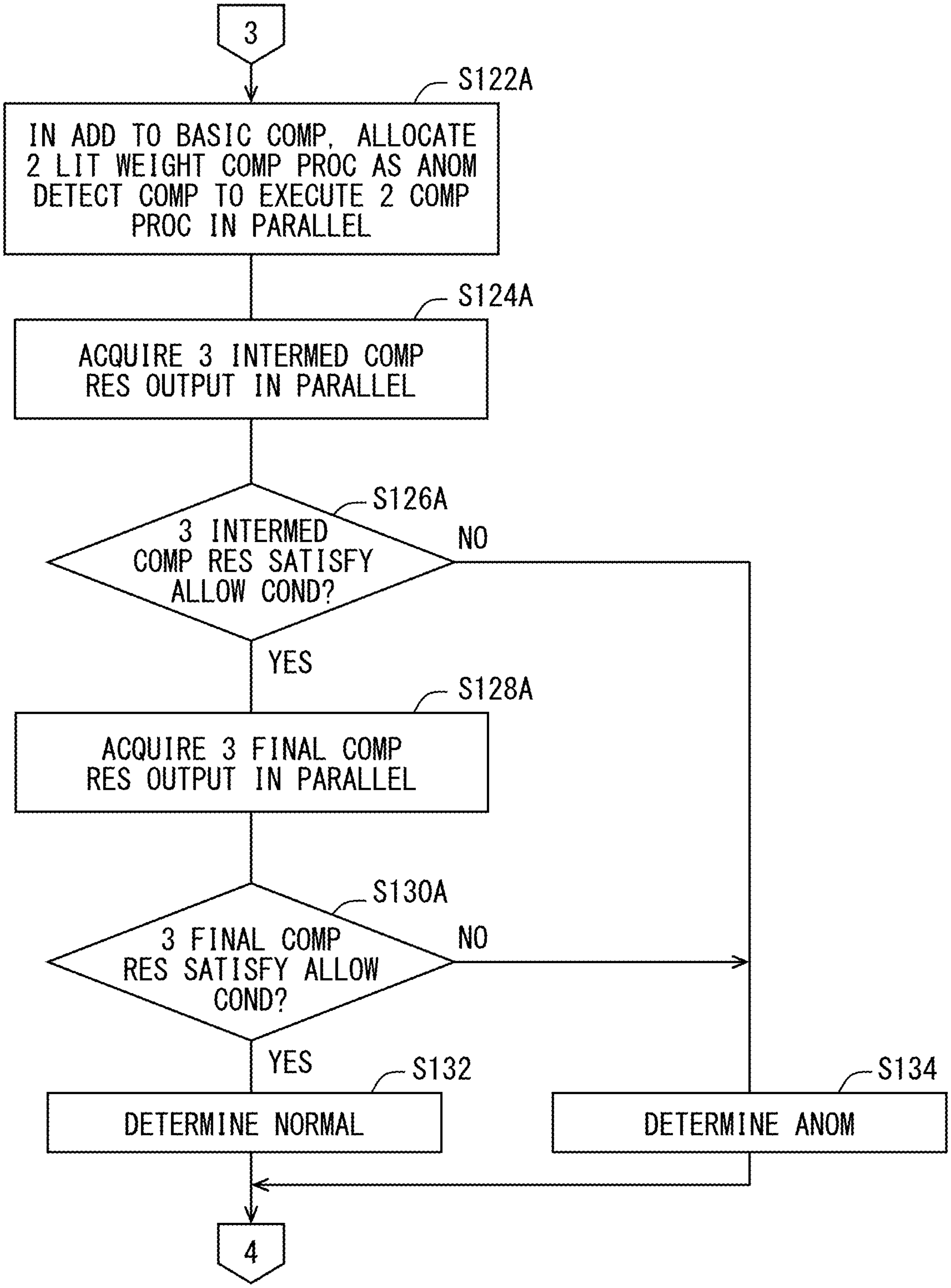
FIG. 9 is a flowchart showing the procedure of an anomaly detection process according to the third embodiment.

The computation system 100 of the third embodiment differs from the computation system 100 of the second embodiment in that it executes the process shown in FIG. 9 instead of the process shown in FIG. 7 in the anomaly detection process. The system configuration and other procedures in the anomaly detection process of the computing system 100 of the third embodiment are the same as those of the computing system 100 of the second embodiment, so the same configurations and the same procedures are denoted by the same reference numerals, and a detailed explanation thereof will be omitted.

In step S122A, the computation allocation unit 11 allocates the computation process to the processor cores so as to execute two lightweight computations in parallel as the anomaly detection computations in addition to the basic computations. The "light weight computation" indicates a computation process that uses a neural network model that has been trained in advance so that the computation load is restricted compared to the basic computation. As a method for restricting the computation load, for example, conventional light weight techniques such as Pruning technique and Sparsity technique, which restrict the computation load by replacing the values of some coefficients that have a low contribution to the computation result with 0, are applicable.

Figure 10:
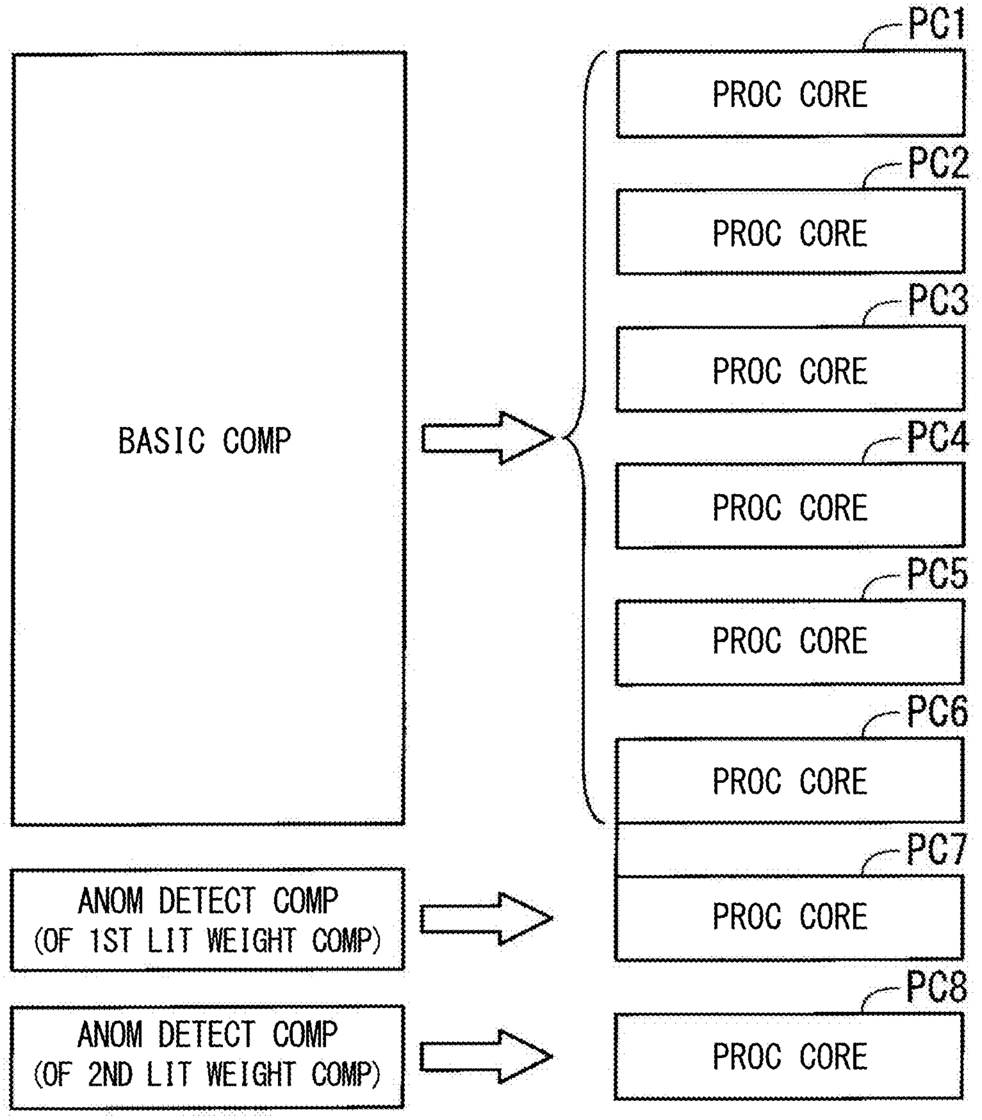
FIG. 10 is an explanatory diagram showing an example of allocation of the computation process in the third embodiment.

The allocation of the computation processes in step S122A will be explained in more detail with reference to the example shown in FIG. 10. In the example shown in FIG. 10, the minimum number of cores for the basic computation is set as six. In such a case, the computation allocation unit 11 allocates the basic computation to the processor cores PC1 to PC6. Further, in the example shown in FIG. 10, the computation allocation unit 11 allocates the first light weight computation, which has a computation load restricted to ⅙ of the computation load of the basic computation, to the processor core PC 7 as the anomaly detection computation, and allocates the second light weight computation, which is the same computation process as the first light weight computation, to the processor core PC8. In the example shown in FIG. 10, the processor cores PC1 to PC6 correspond to the computation processor cores, the processor cores PC7 and PC8 correspond to the anomaly detection processor cores.

In step S124A shown in FIG. 9, the anomaly detection unit 12 acquires three intermediate computation results of the basic computation and two light weight computations that are output in parallel. In the example shown in FIG. 10, the number of processor cores that execute each light weighting computation is ⅙ of the number of processor cores that execute the basic computation. Here, the computational load of the light weight computation is also reduced in weight to be ⅙ of the computational load of the basic computation. Therefore, the intermediate computation results for mutually corresponding pixels are output in parallel with each other.

In step S126A, the anomaly detection unit 12 determines whether the following conditions (1) to (3) are all satisfied as the allowance condition in this embodiment. In addition, the threshold values for conditions (2) and (3) below are, for example, used to values specified in advance through experiments or the like such as the difference between the intermediate computation results when the basic computation and the light weight computation are executed respectively by the processor core that has been confirmed to have no anomaly.

(1) The intermediate computation results of the first light weight computation and the second light weight computation match each other.

(2) The difference between the intermediate computation results of the basic computation and the first light weight computation is less than a predetermined threshold.

(3) The difference between the intermediate computation results of the basic computation and the second light weight computation is less than a predetermined threshold.

If it is determined that at least one of the above conditions (1) to (3) is not satisfied ("NO" at step S128A), in step S134, the anomaly detection unit 12 determines that at least a part of the computation processor core and the anomaly detection processor core have an anomaly. After step S134 ends, the anomaly detection process ends.

On the other hand, if it is determined that all of the above conditions (1) to (3) are satisfied ("YES" at step S126A), in step S128A, the anomaly detection unit 12 acquires three final computation results of the basic computation and two light weight computations that are output in parallel. For the same reason as in the case of the intermediate computation results described above, the final computation results for mutually corresponding pixels are output in parallel with each other.

In step S130A, the anomaly detection unit 12 determines whether the following conditions (4) to (6) are all satisfied as the allowance condition in this embodiment. Further, the threshold values for the following conditions (5) and (6) may be determined in advance in the same manner as the threshold values for the above conditions (2) and (3).

(4) The final computation results of the first light weight computation and the second light weight computation match each other.

(5) The difference between the final computation results of the basic computation and the first light weight computation is less than a predetermined threshold.

(6) The difference between the final computation results of the basic computation and the second light weight computation is less than a predetermined threshold.

If it is determined that all of the above conditions (4) to (6) are satisfied ("YES" at step S130A), in step S132, the anomaly detection unit 12 determines that there is no anomaly in the computation processor core and the anomaly detection processor core. After step S132 ends, the anomaly detection process ends.

If it is determined that at least one of the above conditions (4) to (6) is not satisfied ("NO" at step S130A), in step S134, the anomaly detection unit 12 determines that at least a part of the computation processor core and the anomaly detection processor core have an anomaly. After step S134 ends, the anomaly detection process ends.

According to the computation system 100 of the third embodiment described above, the light weight computation is executed in the anomaly detection core, and it is determined whether the allowance condition is satisfied, which includes a condition that the difference between the computation result of the basic computation and the computation result of the light weight computation is less than a predetermined threshold. Therefore, even if the computation load of the basic computation is large so that the computation process same as the basic computation can not be executed as the anomaly detection computation in parallel to the basic computation, the computation processor core and the anomaly detection processor core can respectively execute the basic computation and the light weight computation in parallel, so that it is possible to detect the presence or absence of an anomaly using the computation results output in parallel with each other, and to detect the presence or absence of an anomaly in real time.

D. Fourth Embodiment

The computation system 100 of the fourth embodiment differs from the computation system 100 of the third embodiment in that the allowance condition in step S130A of the anomaly detection process is different. The system configuration and other procedures in the anomaly detection process of the computing system 100 of the fourth embodiment are the same as those of the computing system 100 of the third embodiment, so the same configurations and the same procedures are denoted by the same reference numerals, and a detailed explanation thereof will be omitted.

In step S130A shown in FIG. 9, the anomaly detection unit 12 determines in this embodiment whether the following condition (7) is satisfied and at least one of condition (8) and condition (9) is satisfied as the allowance condition.

(7) In the final computation results of the first light weight computation and the second light weight computation, the top five classes having high probability that the object included in the image data belongs match each other.

(8) In the final computation results of the basic computation and the first light weight computation, at least one of top five classes having high probability that the object included in the image data belongs match each other.

(9) In the final computation results of the basic computation and the second light weight computation, at least one of top five classes having high probability that the object included in the image data belongs match each other.

In the above conditions (7) to (9), the number of top classes as the comparison target may not be limited to five. Further, in the above conditions (8) and (9), the lower limit of the number of classes that are required to match each other may be two or more.

According to the computation system 100 of the fourth embodiment described above, the anomaly detection unit 12 can detect the presence or absence of an anomaly by determining whether the allowance condition is satisfied, which includes a condition that at least one of the top five classes having high probability that the object included in the image data belongs in the computation result of the basic computation matches a corresponding one of the top five classes having high probability that the object included in the image data belongs in the computation result of the anomaly detection computation.

E. Fifth Embodiment

The computation system 100 of the fifth embodiment differs from the computation system 100 of the fourth embodiment in that the anomaly detection processor core executes the bit number reduction computation instead of the light weight computation in step S122A of the anomaly detection process. The system configuration and other procedures in the anomaly detection process of the computing system 100 of the fifth embodiment are the same as those of the computing system 100 of the fourth embodiment, so the same configurations and the same procedures are denoted by the same reference numerals, and a detailed explanation thereof will be omitted.

The "bit number reduction computation" indicates the computation process that uses a neural network model trained in advance using a weight coefficient with a smaller number of bits than the above-described light weight computation. In this embodiment, the number of bits of the weight coefficient is set to 8 bits in the light weight computation, but the number of bits of the weight coefficient is set to 4 bits in the bit number reduction computation. Here, the number of bits in the bit number reduction computation may not be limited to 4 bits, and may be set to any number of bits smaller than the number of bits of the weight coefficient in the light weight computation.

In the feature in which the light weight computation is executed as the anomaly detection computation, the weight coefficient used in the basic computation and the weight coefficient used in the light weight computation are different from each other, so compared to the feature in which the basic computation is executed as the anomaly detection computation, a larger storage capacity is required in the semiconductor memory device 20 to store the weight coefficient. Furthermore, since different weighting coefficients are read from the semiconductor memory device 20 for the basic computation and the light weight computation, the memory bandwidth is compressed compared to the case where only the weight coefficient used in the basic computation is read.

In the bit number reduction computation, a weight coefficient with a smaller number of bits than in the light weight computation is used, so that it is possible to restrict an increase in the storage capacity for storing the weight coefficient in the semiconductor memory device 20. Furthermore, it is possible to restrict the compression of the memory bandwidth when reading weight coefficient from the semiconductor memory device 20.

According to the computation system 100 of the fifth embodiment described above, a weight coefficient with a smaller number of bits is used compared to the light weight computation, so that it is possible to restrict the increase in the storage capacity for storing the weight coefficient in the semiconductor memory device 20. Furthermore, it is possible to restrict the compression of the memory bandwidth when reading weight coefficient from the semiconductor memory device 20.

F. Other Embodiments (F1) In the above embodiments, the anomaly detection unit 12 executes both the determination using the intermediate computation result and the determination using the final computation result. The present embodiments may not be limited to this feature. The anomaly detection unit 12 may perform only one of the determination using the intermediate computation result and the determination using the final computation result.

(F2) In the above embodiments, the processor cores PC1 to PC8 receive a single image data input, share mutually different areas in the image data with a plurality of processor cores, and execute the computation process in parallel with each other. The present embodiments may not be limited to this feature. The processor cores PC1 to PC8 may receive a plurality of image data items, share different image data items with the plurality of processor cores, and execute the computation process in parallel with each other.

Figure 11:
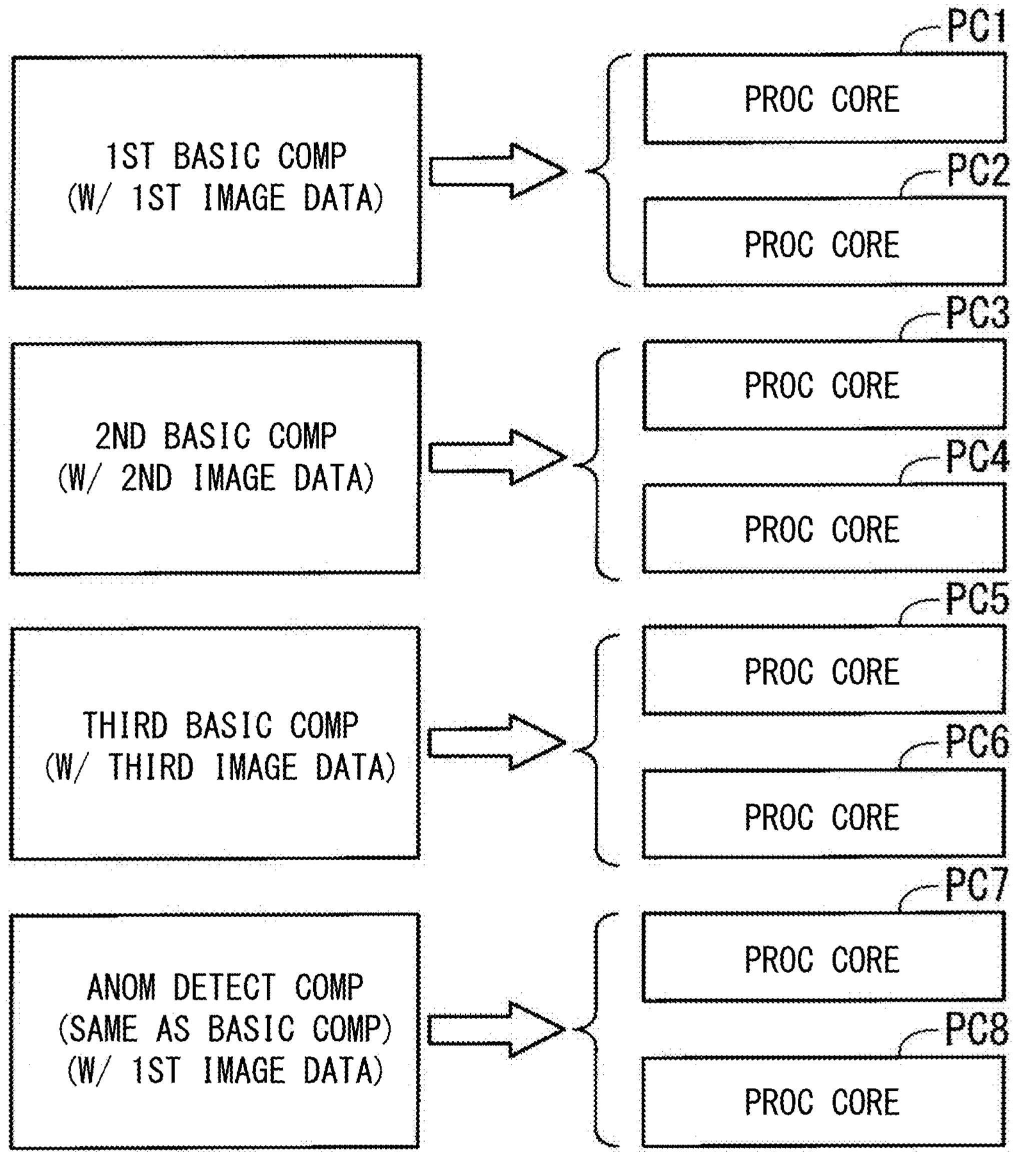
FIG. 11 is an explanatory diagram showing an example of allocation of the computation process in the other embodiment.

This feature will be explained in more detail with reference to FIG. 11. As shown in FIG. 11, the processor cores PC1 and PC2 may execute a first basic computation on first image data as the process target, and the processor cores PC3 and PC4 may execute a second basic computation on second image data as the process target. The processor cores PC5 and PC6 may execute a third basic computation on the third image data as the process target. Further, in such a case, the processor cores PC7 and PC8 may execute the computation process same as the first basic computation on the first image data as the process target as the anomaly detection computation like the processor cores PC1 and PC2. By executing each computation process in this way, it is possible to detect the presence or absence of an anomaly in the processor cores PC1, PC2, PC7, and PC8 while executing each basic computation on three image data in parallel in the processor cores PC1 to PC6. Furthermore, after the above-described computation process is completed, when the processor cores PC1 to PC6 execute the basic computation on three new image data in parallel, the processor cores PC7 and PC8 may execute the anomaly detection computation on the image data same as the image data of the process target of the processor cores PC3 and PC4. By executing each computation process in this way, it is possible to sequentially detect whether or not an anomaly has occurred in a processor core different from the previous one each time a computation process is performed on new image data. Thus, it is possible to detect whether or not an anomaly has occurred in each of all processor cores in turn while executing the basic computation in parallel on the three image data.

(F3) In the third embodiment, the computation allocation unit 11 allocates the computation processes to the processor cores so as to perform two light weight computations as the anomaly detection computation in addition to the basic computation in step S122A of the anomaly detection process. The present embodiments may not be limited to this feature. In step S122A, the computation allocation unit 11 may allocate the computation processes to the processor cores so as to execute one lightweight computation as the anomaly detection computation in addition to the basic computations. When the computation load of the basic computation is the same as the example shown in FIG. 10, the computation allocation unit 11 may allocate one anomaly detection computation to the processor cores PC7 and PC8. In such a case, the computational load of the light weight computation may only needs to be reduced to ⅓ of that of the basic computation. With such a configuration, compared to a configuration that further reduces the computation load of the light weight computation, it is possible to restrict the difference in the computation results between the basic computation and the light weight computation from increasing, and it is possible to restrict a decrease in the accuracy of anomaly detection.

(F4) In the third embodiment, the computation allocation unit 11 causes the anomaly detection processor core to execute the computation process, as the light weight computation, prepared by applying the conventional light weight technique to the basic computation. The conventional light weight technique restricts the computation load by replacing the values of some coefficients that have a low contribution to the computation result with 0. The present embodiments may not be limited to this feature. The computation allocation unit 11 may cause the anomaly detection core to perform the computation process with the computation load restricted by using a neural network model different from the neural network model used in the basic computation as a light weight computation. For example, when ResNet is used as a neural network model in the basic computation, MobileNet, which is a neural network model that implements image recognition like ResNet, may be used in the light weight computation. Since the layer configuration of the MobileNet is simpler than that of the ResNet, it is possible to restrict the computation load using the MobileNet in the light weight computation, compared with the basic computation using the ResNet.

The computation system 100 and methods thereof described in the present disclosure may be implemented by a dedicated computer including a processor and a memory programmed to perform one or more functions embodied by a computer program. Alternatively, the computation system 100 and the method thereof described in the present disclosure may be implemented by a dedicated computer including a processor implemented by one or more dedicated hardware logic circuits. Alternatively, the computation system 100 and the method thereof according to the present disclosure may be achieved using one or more dedicated computers constituted by a combination of a processor and a memory programmed to execute one or more functions and a processor formed of one or more hardware logic circuits. The computer program may also be stored in a computer-readable and non-transitory tangible storage medium as instructions to be executed by a computer.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, some of the technical features may be omitted as appropriate.

[Feature 1]

A computation system performs a computation process using a neural network model. The computation system includes: at least one of (i) a circuit and (ii) a processor having a memory storing computer program code. The at least one of the circuit and the processor having the memory is configured to cause the computation system to provide at least one of a plurality of processor cores; a computation allocation unit; and an anomaly detection unit. The plurality of processor cores execute the computation process. The computation allocation unit determines a computation processor core, which is one of the plurality of processor cores and is to execute the computation process, according to a computation load of the computation process, and causes the computation processor core to execute the computation process. The anomaly detection unit detects presence or absence of an anomaly in the computation processor core. The computation allocation unit causes at least a part of the plurality of processor cores different from the computation processor core to execute an anomaly detection computation prepared based on a basic computation, which is the computation process to be executed by the computation processor core, in parallel to the basic computation. When a difference between a first computation result, which is a computation result of the basic computation, and a second computation result, which is a computation result of the anomaly detection computation, satisfies a predetermined allowance condition, the anomaly detection unit determines that the computation processor core and an anomaly detection processor core that executes the anomaly detection computation are normal. When the difference does not satisfy the allowable condition, the anomaly detection unit determines that at least a part of the computation processor core and the anomaly detection processor core has anomaly.

[Feature 2]

In the computation system according to the feature 1, the anomaly detection unit detects the presence or absence of the anomaly by using the first computation result and the second computation result output in parallel with the first computation result.

[Feature 3]

In the computation system according to the feature 1, the at least one of the circuit and the processor having the memory is configured to cause the computation system to further provide: a semiconductor memory device that stores the first computation result. The anomaly detection unit detects the presence or absence of the anomaly by using the first computation result read from the semiconductor memory device and the second computation result output after the first computation result.

[Feature 4]

In the computation system according to any one of the features 1 to 3, the anomaly detection unit detects the presence or absence of the anomaly by using, as the first computation result and the second computation result, at least one of: a final computation result that is a computation result in a final layer among a plurality of layers constituting the neural network model; and an intermediate computation result that is a computation result in an intermediate layer among the plurality of layers.

[Feature 5]

In the computation system according to any one of the features 1 to 4, the computation allocation unit causes the anomaly detection processor core to execute a computation process same as the basic computation as the anomaly detection computation. The allowance condition includes a condition that the first computation result and the second computation result match each other.

[Feature 6]

In the computation system according to any one of the features 1 to 4, the computation allocation unit causes the anomaly detection processor core to execute, as the anomaly detection computation, a light weight computation that is prepared by training in advance so as to restrict a computation load to be smaller than the basic computation. The allowance condition includes a condition that the difference is less than a predetermined threshold.

[Feature 7]

In the computation system according to any one of the features 1 to 4, the neural network model is configured as a multi-class classifier that outputs a probability that the image data belongs to one class among a plurality of predetermined classes based on the image data. The computation allocation unit causes the anomaly detection processor core to execute, as the anomaly detection computation, a light weight computation that is trained in advance so as to restrict a computation load to be smaller than the basic computation. The allowance condition includes a condition that a predetermined number of classes among top N classes in descending order of the probability in the first computation result matches corresponding classes among top N classes in descending order of the probability in the second computation result matches, and N indicates a natural numerical number.

[Feature 8]

In the computation system according to any one of the features 1 to 7, the computation allocation unit causes the anomaly detection processor core to execute, as the anomaly detection computation, a bit number reduction computation that is trained in advance using a predetermined weight coefficient having a smaller number of bits than a light weight computation.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause a computation system to perform functions" should be understood that (i) only the circuit can cause a computation system to perform all the functions, (ii) only the processor can cause a computation system to perform all the functions, or (iii) the circuit can cause a computation system to perform at least one of the functions and the processor can cause a computation system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A computation system for performing a computation process using a neural network model, the computation system comprising:

a plurality of processor cores that execute the computation process;

a computation allocation unit that determines a computation processor core, which is one of the plurality of processor cores and is to execute the computation process, according to a computation load of the computation process, and causes the computation processor core to execute the computation process; and an anomaly detection unit that detects presence or absence of an anomaly in the computation processor core by using a first computation result and a second computation result which is output in parallel with the first computation result, wherein:

the computation allocation unit causes at least a part of the plurality of processor cores different from the computation processor core to execute an anomaly detection computation prepared based on a basic computation, which is the computation process to be executed by the computation processor core, in parallel to the basic computation;

when a difference between the first computation result, which is a computation result of the basic computation, and the second computation result, which is a computation result of the anomaly detection computation, satisfies a predetermined allowance condition, the anomaly detection unit determines that the computation processor core and an anomaly detection processor core that executes the anomaly detection computation are normal; and when the difference does not satisfy the predetermined allowance condition, the anomaly detection unit determines that at least a part of the computation processor core and the anomaly detection processor core has the anomaly.

2. The computation system according to claim 1, further comprising:

a semiconductor memory device that stores the first computation result, wherein:

the anomaly detection unit detects the presence or absence of the anomaly by using the first computation result read from the semiconductor memory device and the second computation result which is output after the first computation result.

3. The computation system according to claim 1, wherein:

the anomaly detection unit detects the presence or absence of the anomaly by using, as the first computation result and the second computation result, at least one of: a final computation result that is a computation result in a final layer among a plurality of layers constituting the neural network model; and an intermediate computation result that is a computation result in an intermediate layer among the plurality of layers.

4. The computation system according to claim 1, wherein:

the computation allocation unit causes the anomaly detection processor core to execute a computation process same as the basic computation as the anomaly detection computation; and the predetermined allowance condition includes a condition that the first computation result and the second computation result match each other.

5. The computation system according to claim 1, wherein:

the computation allocation unit causes the anomaly detection processor core to execute, as the anomaly detection computation, a light weight computation that is trained in advance so as to restrict a computation load to be smaller than the basic computation; and the predetermined allowance condition includes a condition that the difference is less than a predetermined threshold.

6. The computation system according to claim 1, wherein:

the neural network model is configured as a multi-class classifier that outputs a probability that image data belongs to one class among a plurality of predetermined classes based on the image data;

the computation allocation unit causes the anomaly detection processor core to execute, as the anomaly detection computation, a light weight computation that is trained in advance so as to restrict a computation load to be smaller than the basic computation; and the predetermined allowance condition includes a condition that a predetermined number of classes among top N classes in descending order of the probability in the first computation result matches corresponding classes among top N classes in descending order of the probability in the second computation result matches, and N indicates a natural numerical number.

7. The computation system according to claim 1, wherein:

the computation allocation unit causes the anomaly detection processor core to execute, as the anomaly detection computation, a bit number reduction computation that is trained in advance using a predetermined weight coefficient having a smaller number of bits than a light weight computation.

8. The computation system according to claim 1, further comprising:

at least one of (i) a circuit and (ii) a processor having a memory storing computer program code, wherein the at least one of the circuit and the processor having the memory is configured to cause the computation system to provide at least one of: the plurality of processor cores; the computation allocation unit; and the anomaly detection unit.

9. The computation system according to claim 1, wherein:

a minimum number of processor cores required to complete the basic computation within an allowance time is set in advance for each type of the basic computation to be executed.

10. The computation system according to claim 1, wherein:

the part of the plurality of processor cores includes first processor cores and second processor cores different from the first processor cores, and the computation allocation unit causes the first processor cores and the second processor cores each to execute the computation process so that two computation processes same as the basic computation are executed in parallel to each other as the anomaly detection computation resulting respectively in two second computation results including the second computation result.

11. The computation system according to claim 10, further comprising:

when the first computation result and the two second computation results do not all match each other, identify a probability that the anomaly has occurred in processor cores of the plurality of processor cores that resulted in the computation result that does not match.

* * * * *